United States Patent

[11] 3,620,424

| [72] | Inventor | Gilbert R. Grigsby<br>Los Angeles, Calif. |
|---|---|---|
| [21] | Appl. No. | 820,396 |
| [22] | Filed | Apr. 30, 1969 |
| [45] | Patented | Nov. 16, 1971 |
| [73] | Assignee | Lubrastart International<br>Los Angeles, Calif. |

[54] METERED FLUID DISPENSING APPARATUS
8 Claims, 8 Drawing Figs.

[52] U.S. Cl. .................................................. 222/450
[51] Int. Cl. ............................................... G01f 11/30
[50] Field of Search .......................................... 222/335,
440, 450, 76; 123/180, 180 A, 180 E, 187.5

[56] References Cited
UNITED STATES PATENTS

| 3,162,336 | 12/1964 | Erickson | 222/335 X |
| 3,294,290 | 12/1966 | Erickson et al. | 222/335 |
| 1,501,376 | 7/1924 | Skinner | 123/180 A |
| 3,151,783 | 8/1964 | Shaw et al. | 222/335 |

Primary Examiner—Raphael H. Schwartz
Attorney—Fulwider, Patton, Rieber, Lee & Utecht ABSTRACT: An apparatus for dispensing a metered quantity of fluid, in which the fluid is stored under pressure in a container that is normally open to a metering chamber, but which, when the apparatus is actuated, has valve means closing the connection between the storage container and the measuring chamber, and the measurin chamber is then connected to a discharge outlet for the positive ejection of the fluid.

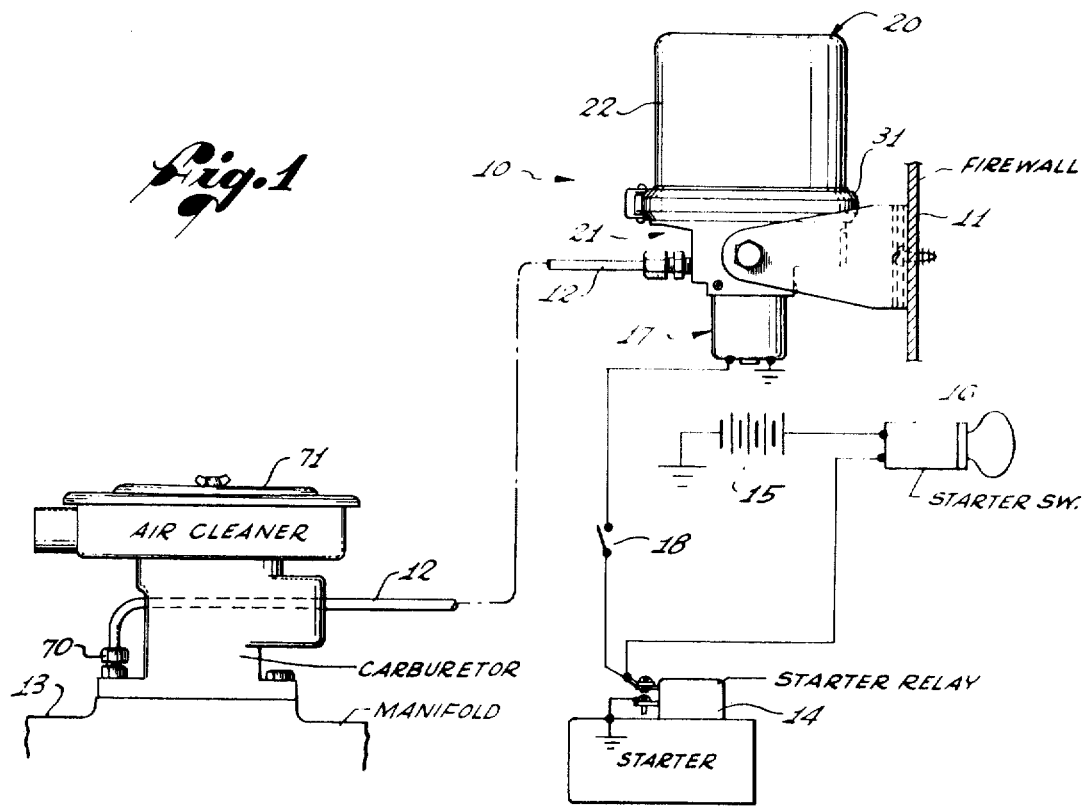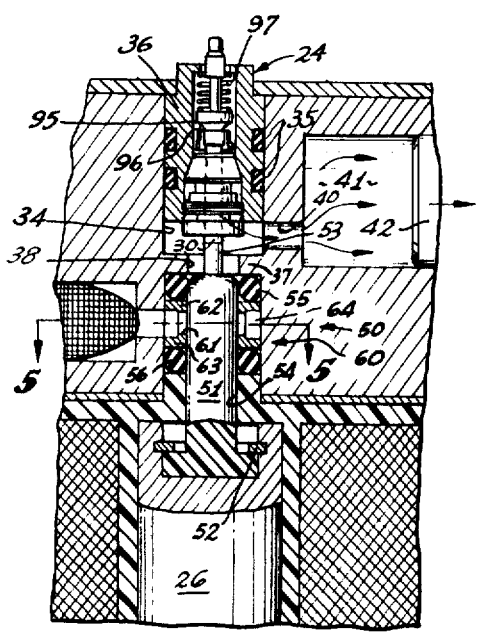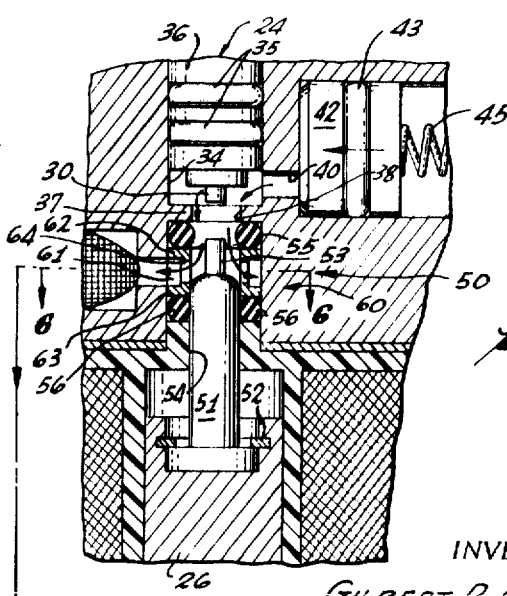

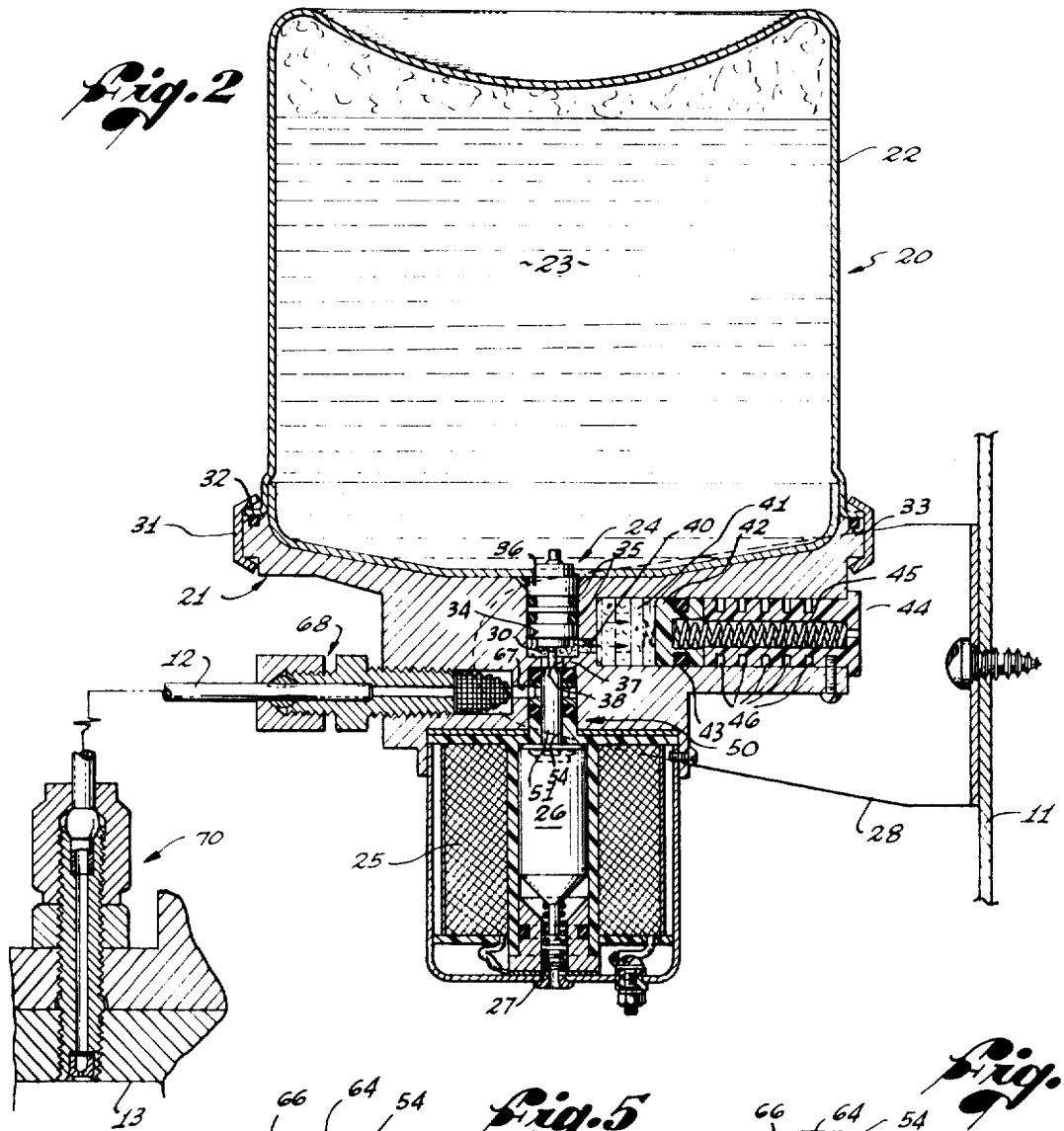
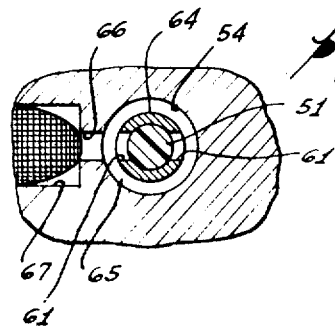
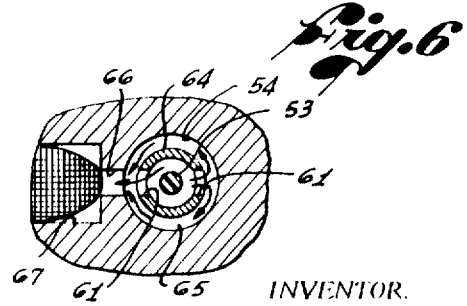
INVENTOR.
GILBERT R. GRIGSBY
BY Fulwider, Patton, Rieber, Lee, and Utecht
ATTORNEYS

PATENTED NOV 16 1971

INVENTOR.
GILBERT R. GRIGSBY
BY Fulwider, Patton, Rieber,
Lee, and Utecht
ATTORNEYS

METERED FLUID DISPENSING APPARATUS

BACKGROUND OF THE INVENTION

The present invention relates broadly to a device for dispensing a predetermined amount of fluid each time the device is actuated. In its broader aspects, the device has application to a wide variety of uses, ranging from the depositing of a predetermined quantity of fluid into a container, e.g., the depositing of a certain amount of pigment into a can of paint, to the ejection of a metered quantity of lubricating oil each time a reciprocating member reaches a certain point in its travel. In the present disclosure, the device is shown as used to inject a quantity of starting fluid into the intake manifold of an internal combustion engine.

The difficulty of starting an internal combustion engine in very cold weather is well known, and the problem is particularly acute with engines operating on a diesel cycle, and in certain high-performance otto cycle engines that have been designed and adjusted for normal operation at a relatively high speed, such as some of the so-called "sports cars." Thus, winter operation of internal combustion engines presents many difficulties, and very important among these difficulties is the problem of starting the engine. In many instances, starting is made easier by the introduction of a very volatile starter fluid, such as ether, into the intake manifold of the engine.

Heretofore, starter fluids have been introduced into an internal combustion engine by removing the air filter from the carburetor and pouring some of the fluid into the carburetor, or by using certain specialized devices that inject a certain amount of fluid into the manifold. The direct pouring of the starter fluid into the carburetor has many disadvantages, including the difficulties of removing the air filter in below-freezing weather, the difficulty of providing a measured quantity of fluid, and the explosion hazard caused by the open pouring of ether, with inadequate ventilation. The previously available devices for injecting the starter fluid into the intake manifold have usually been of the nonmetering type, and discharge the fluid so long as they are actuated.

The present device differs from the previous devices in that a single metered charge is delivered each time the device is actuated, but only a single charge is delivered for each actuation. The quantity of fluid delivered remains constant regardless of the pressure within the storage container and independent of the temperature, and the quantity delivered can be set by a simple adjustment to meet the particular requirements of the application.

SUMMARY OF THE INVENTION

The metered fluid-measuring device of the present invention includes a pressurized supply container or reservoir containing the fluid to be dispensed. A metering chamber having a resiliently urged movable piston therein is connected through a normally open valve to the reservoir, and actuating means are provided to close the normally open valve between the reservoir and chamber and to open a normally closed valve to permit the fluid within the chamber to be discharged through an appropriate outlet.

BRIEF DESCRIPTION OF THE DRAWINGS

FIG. 1 is a generally schematic representation of the fluid-metering device of the present invention applied to an internal combustion engine;

FIG. 2 is a vertical cross-sectional view of the fluid-dispensing device of the present invention, with the connection to the intake manifold of the engine also shown in cross section;

FIG. 3 is an enlarged cross-sectional view of the valve portion or control block of the dispensing apparatus, showing the valves in their normal position;

FIG. 4 is a cross-sectional view, similar to FIG. 3, showing the valves in their actuated position;

FIG. 5 is a cross-sectional view perpendicular to that of FIGS. 3 and 4, taken on the line 5—5 of FIG. 3, with the valves in their normal position;

FIG. 6 is a view similar to FIG. 5, taken on the line 6—6 of FIG. 4, with the valves in their actuated position;

DESCRIPTION OF THE PREFERRED EMBODIMENT

Figure 7:
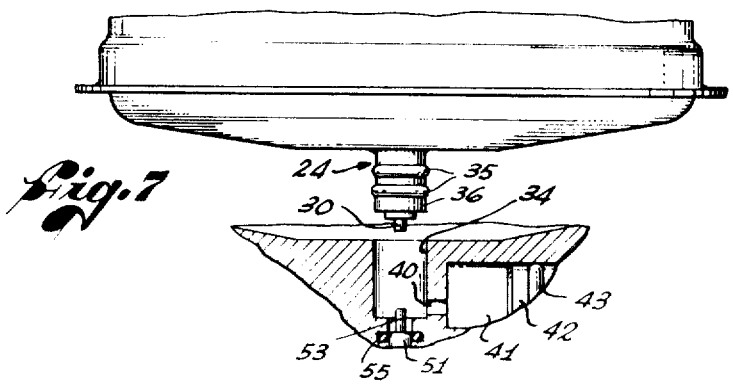
FIG. 7 is a fragmentary exploded view, partially in section, of the lower end of the reservoir and the upper portion of the control block.

Referring now to the drawings and particularly to FIG. 1 thereof, the numeral 10 indicates generally the metered fluid-dispensing apparatus, here shown as mounted on the firewall 11 separating the engine from the passenger compartment of an automobile. The outlet of the dispensing apparatus 10 is connected by a tube 12 to the intake manifold 13 of an internal combustion engine (not shown), through appropriate means hereinafter described. In the embodiment shown in FIG. 1, the fluid-dispensing apparatus 10 is electrically actuated and is connected to an appropriate terminal of the starter relay 14 for the engine. It will be appreciated that in the normal internal combustion engine, the battery 15 has one of its terminals connected to the frame of the vehicle and the other terminal connected through a starter switch 16 to a starter relay 14 that controls the heavy current to the starter. The actuating means 17 of the dispensing apparatus 10 is connected to an appropriate terminal of the starter relay 14 so that the actuating means is energized only when the starter is energized. If desired, an additional switch 18 may be connected in the circuit between the starter relay 14 and the actuating means 17 so that the actuating means may be disabled if so desired.

The fluid-dispensing apparatus consists of three major portions, a fluid reservoir 20, a metering and control block 21 and an actuating member 17. These members and their components are shown in greater detail in FIG. 2 where it is seen that the fluid reservoir consists of a pressurized container or tank 22 holding the fluid 23 to be metered, the fluid being discharged through a supply valve 24 located in the bottom of the tank.

The tank rests upon the upper surface of the control block 21 and is held to the block by any suitable means, while the actuating member 17 is mounted on the under surface of the block. In the present embodiment, the actuating member 17 includes a solenoid 25 having a movable armature 26 urged upwardly by a spring 27 but when the solenoid winding is energized, the armature is moved downwardly, against the urging of the spring. Generally, the tank 22 is removable from the control block 21, while the actuating member 17 is intended to remain affixed to the lower surface of the block. As indicated in FIGS. 1 and 2, the block may be attached to the firewall by a bracket 28 or any other suitable means of support may be used.

As mentioned, the tank 22 contains the fluid 23 under pressure, and the tank is provided with a supply valve 24 of the type generally used in pneumatic tires, in which a valve head 95 is adapted to bear against a valve seat 96 to prevent the escape of fluid from the container. A spring 97 generally urges the head against the seat, and the pressure of the fluid within the container aids in seating the valve head. A valve stem 30 projects from the head so that by pressing inwardly on the stem, the valve head 95 is pushed away from the valve seat 96 and fluid may be passed from the interior of the container or tank. The use of such a supply valve 24 permits the tank 22 to be filled and transported separately from the remainder of the dispensing apparatus 10, and when the filled tank is placed upon the upper surface of the control block 21, the supply valve is then opened to permit the discharge of fluid from the tank.

The tank 22 is held to the block 21 by any suitable means, such as a clamping band 31 that engages a flange 32 projecting from the lower end of the tank, the band preferably being of the type provided with a toggle-compressing means (not shown) of well-known type. As seen in FIG. 2, the edges of the clamping band are preferably formed at angles so that the tank is firmly urged into contact with the upper surface of the block, and sealing means, such as an O-ring 33, provide a fluid seal between the tank and the block to prevent the escape of fluid.

The upper surface of the control block 21, and the lower surface of the tank 22 are formed complementary to each other and a bore or transfer recess 34 in the upper surface of the block receives the supply valve 24 of the tank. Some form of sealing means, such as O-rings 35 around the supply valve housing 36 are provided to prevent the escape of fluid under pressure to the space between the valve body and the outer O-ring 33.

As best seen in FIGS. 3 and 4, at the bottom of the recess 34 receiving the supply valve 36 is a wall 37 having a centrally located aperture 38 therein. Above this wall and communicating with the recess is a passageway 40 leading to a metering chamber 41. For convenience, the metering chamber 41 may be formed as a bore extending from the exterior of the block toward the recess, and a piston 42, having an O-ring 43 therein to provide a sealing fit, is slidably mounted within the bore. A plug 44 suitably, but removably, held in the outer end of the bore receives a spring 45 that extends from the plug to the piston 42 to urge the piston inwardly, toward the recess 34. The plug 44 acts as a limit means for the piston 42, and may be of a predetermined length, or may be provided with a series of circumferentially extending grooves 46 providing reduced sections at which the plug may be cut or broken to change the length of the plug. In this way, the distance that the piston may travel can be adjusted for various conditions.

As hereinafter described, fluid 23 from the tank 22 emerges from the supply valve 24 into the recess 34 and passes through the passageway 40 to fill the chamber 41, forcing the piston 42 outwardly, as indicated in FIG. 3. When the actuator 17 is operated, the supply valve 24 is closed and thereafter a discharge valve 50 is opened. The spring 45 then forces the piston 42 inwardly to discharge the fluid 23 through the passageway 40, into the recess 34, out the aperture 38 in the wall 37, and thereafter out through the discharge means.

As previously indicated, in the present embodiment, the actuator consists of a solenoid 25 having a core 26 or armature urged upwardly by a spring 27. At its upper end, the armature 26 is provided with a plunger 51 held to the armature as by a retaining ring 52, and carrying a pin 53 on its upper end. It will be noted that the actuator 17 and plunger 51 are concentric with the recess 34 and extend into a valve bore 54 of substantially the same size as, and concentric with, the aperture 38 in the wall 37. The plunger 51 normally extends to the wall 37, while the pin 53 normally projects through the aperture 38 to engage the valve stem 30 of the supply valve 24, urging the valve stem in and opening the supply valve to release the fluid 23 from the tank 22 into the recess 34 and then into the chamber 41.

Sealing means around the plunger 51, such as upper and lower O-rings 55 and 56, respectively, prevent the travel of fluid from the recess 34 along the plunger. Intermediate the upper O-ring 55 and the lower O-ring 56 is a spool member 60 separating the O-rings and having discharge ports 61 leading to a discharge passageway. The spool 60 has an upper flange 62 bearing against the upper O-ring 55, a lower flange 63 bearing against the lower O-ring 56, with a web 64 separating the two flanges and providing an annular space 65 between them. One or more ports 61 extend between the interior of the spool 60 and the annular space 65, and a discharge aperture 66 is formed in the block 21, aligned with the annular space. The discharge aperture 66 connects to a discharge passageway 67 and, as seen in FIG. 2, a suitable connector 68 may be inserted in the discharge passageway, connecting the discharge conduit or tube 12 to the metering apparatus.

When the actuating means 17 is operated, the plunger 51 and pins 53 are moved downwardly, thus first closing the supply valve 24 from the supply tank 20, and thereafter uncovering the ports 61 in the spool 60 connecting the interior of the spool to the annular recess 65. Fluid within the chamber 41, urged by the spring biased piston 42, moves out of the chamber, through the aperture 38 in the wall 37, into the interior of the spool 60 and out through the ports 61 and annular recess 65, through the discharge passageway 66 and into the discharge means, all as shown in FIG. 4. In the particular embodiment illustrated, the fluid, as previously mentioned, preferably is a form of ether, to which a lubricant has been added so that a volatile fuel, together with an upper cylinder lubricant, is provided. In this way, when the starter switch 16 is turned on, the starting fluid 23 is discharged into the intake manifold 13 at the same time that the starter begins to turn the crankshaft, and the engine normally starts within one or two revolutions. Regardless of how long the starter switch is turned on, only one metered quantity of starting fluid is discharged into the intake manifold, thus preventing an excessive amount of volatile and explosive starting fluid from accumulating in the cylinders.

It will be noted that with the particular arrangement hereindescribed and shown, the opening and closing of the valves follows a predetermined sequence. Thus, when the actuating means 17 is operated, the supply valve 24 between the supply tank 22 and the expandable chamber is first closed, and thereafter, the discharge valve 50, formed by the plunger 51 and the ports 61, is opened. When the actuator 17 is deenergized, the discharge valve 50 is first closed, and thereafter the inlet valve 24 is opened. In each case, the two valves cooperate so that one closes before the other opens so that there is no possibility of the direct flow of fluid from the supply tank 22 to the discharge tube 12.

While it is not essential to the operation of the device, one form of connection to the intake manifold 13 is illustrated in FIG. 2 where it is seen that one of the bolts 70 holding the carburetor 71 to the intake manifold is a hollow bolt adapted to receive the tube 12 through which the starting fluid is carried from the metering device to the intake manifold. Such hollow bolts are well known and frequently found as standard equipment on automobiles.

The supply tank 20 heretofore shown and described is one that is intended to be filled and pressurized at the factory, and is not intended to be refilled by the user. This is the normal form of reservoir or tank, and is the form that will generally be used by the average motorist. In cases where the device is installed in industrial plants where skilled personnel are available, a rechargeable form of reservoir may be used. Such a reservoir is shown in FIG. 8.

As seen in that figure, the rechargeable tank 80 consists of a container 81 having a valve 24 similar to that previously described with the tank held to the block 21 by any suitable means. The upper end of the container 81 is provided with a sleeve 82 extending downwardly into the tank a predetermined distance to provide head space 83 for a pressurizing gas. The sleeve 82 is brazed, welded, or otherwise securely connected to the tank, and at its lower end is provided with a spider 84 having a centrally located piercing pin 85. The interior of the sleeve 82 is provided with screw threads 86, and a cooperating cap 87 has corresponding threads so that the cap may be screwed tightly into the sleeve. A charging cartridge 88, such as those commonly used for inflating various devices, is mounted within the cap 87 and the seal across the end of the cartridge is adapted to be pierced by the piercing pin 85 when the cap has been turned into the threaded sleeve 82 a sufficient distance.

A pressure gauge 90 may be provided to give an indication of the amount of fluid within the tank, since it will be apparent that as the fluid within the tank is ejected, the pressure will be reduced.

Figure 8:
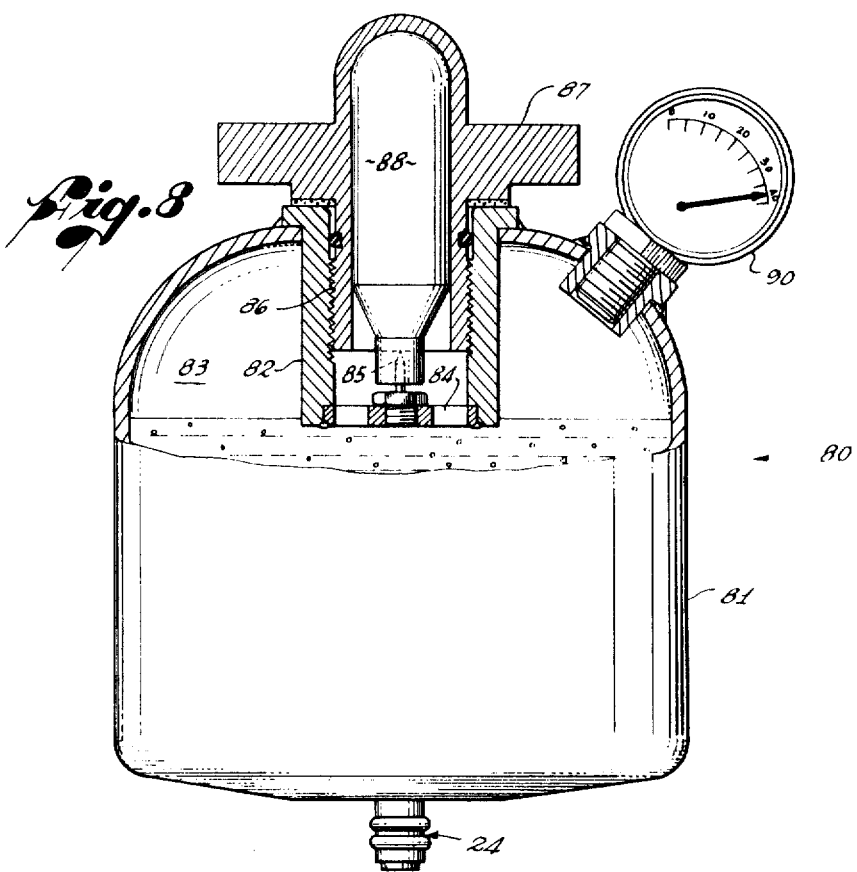
FIG. 8 is an elevational view, partially in section, of an alternate form of reservoir.

In using the form of device shown in FIG. 8, the cap 87 is first removed and the tank is filled with the desired fluid to the bottom of the sleeve 82. Because of the fact that air is trapped in the head space 83 above the bottom of the sleeve 82, attempting to fill the tank above the bottom of the sleeve will result in the level of fluid within the tank rising much faster than the level of fluid within the tank. In this way, the proper amount of liquid may be visually determined, and the cap 87, with the new pressurizing cartridge 88, may be then placed in the sleeve and turned to seat the cap, piercing the cartridge seal, and pressurizing the tank. When the tank is empty, it may be easily recharged.

Because of the fact that a chamber of predetermined volumetric capacity is used to measure the quantity of fluid that is discharged, the amount of fluid ejected by each operation of the actuator is a constant regardless of the pressure within the supply tank, regardless of the time that the actuator is energized, and regardless of the temperature of the fluid. Since the weight and inertia of the moving parts are kept to a minimum, the device may be operated very rapidly, if this is desirable, and will deliver a full charge for each actuation.

While the device has been described in connection with its application to the provision of starting fluid for internal combustion engines, it clearly is usable, with no real modification, for the delivery of measured quantities of lubricating oil, volatile fluids into an air conditioning duct, and many other applications where a measured quantity of fluid must be delivered upon operation of an actuating member. The actuating means of the form described has been shown as an electrically operated solenoid, but it will be appreciated that this is merely a motion-producing device, and that any other means providing mechanical actuation of the plunger would operate equally well.

For these reasons, the invention is not to be limited to the particular form or arrangement of parts hereindescribed and shown, except as limited by the following claims.

What is claimed is:

1. A fluid-metering device which includes:
    means for supplying fluid under pressure;
    fluid discharge means;
    a valve housing having a passageway therethrough, the first end of said passageway being connected to said means for supplying fluid, and the second end of said passageway being connected to said fluid discharge means;
    a first valve selectively operable to open or close said first end of said passageway to said means for supplying fluid;
    a second valve selectively operable to open or close said second end of said passageway to said fluid discharge means;
    a resiliently expandable chamber connected to said passageway intermediate said first and second valves and operable to receive a predetermined amount of said starting fluid when said first valve is opened and to discharge said predetermined amount of fluid when said second valve is opened, said chamber having a slidable piston therein, resiliently urged toward the end of said chamber connected to said passageway, and having stop means to limit the movement of said piston and hence the volume of fluid discharged from said chamber; and
    valve-actuating means selectively operable to close said first valve and thereafter open said second valve, or to close said second valve and thereafter open said first valve, whereby said valves are opened in sequence and both valves are never opened simultaneously.

2. A device as defined in claim 1, in which said expandable chamber has a slidable piston mounted therein, resiliently urged toward the end of said chamber connected to said passageway, and stop means are provided to limit the movement of said piston and hence the volume of fluid discharged from said chamber.

3. A device as defined in claim 2, in which said piston is resiliently urged by spring means, and the pressure of said fluid from said supply means is sufficient to overcome the urging of said spring and thus urge said piston away from said end of said chamber, and the urging of said spring is sufficient to move said piston toward said end of said chamber to force said fluid out said discharge means.

4. A fluid-metering device which includes:
    a container for fluid under pressure, said container having a valve adapted to be selectively opened for the release of fluid;
    support means adapted to receive said container and make a sealing fit therewith;
    expandable chamber means within said support means, including a piston slidable within said chamber and a spring urging said piston toward one end of said chamber;
    a valve chamber having a passageway extending to said one end of said expandable chamber, said valve chamber extending to said valve in said container;
    fluid discharge means including a passageway extending to said valve chamber;
    a discharge valve in said passageway between said discharge means and said valve chamber, selectively operable to open said passageway for the discharge of fluid;
    and actuating means for operating said valves in such a manner that said container valve is normally open to release fluid from said container to fill said expandable chamber, against the urging of said spring, said discharge valve being closed during the time said container valve is open, said actuating means being operable to close said container valve and thereafter open said discharge valve to release fluid from said expandable chamber, under the urging of said spring.

5. A device as defined in claim 4, in which
    stop means are provided to limit the movement of said piston, thereby determining the maximum and minimum volume of said expandable chamber.

6. A device as defined in claim 4, in which
    said actuator comprises a plunger connected so said discharge valve and adapted to engage said container valve.

7. Starting means for an internal combustion engine having a starter which includes:
    a container holding starting fluid under pressure, having a valve adapted to be selectively opened for the release of fluid;
    support means adapted to receive said container and make a sealing fit therewith;
    an expandable chamber adapted to receive a predetermined quantity of said fluid under pressure;
    a valve chamber extending to said valve in said container and having a passageway extending to said expandable chamber;
    fluid discharge means including a passageway extending to said valve chamber;
    a discharge valve in said passageway between said discharge means and said valve chamber, selectively operable to open said passageway for the discharge of fluid;
    valve actuating means selectively operable to close said discharge valve and thereafter open said container valve whereby said expandable chamber is filled with fluid under pressure, or operable to close said container valve and thereafter open said discharge valve whereby said fluid under pressure in said expandable chamber is discharged through said fluid discharge means, and both said valves are never open at the same time; and
    operating means connected to said starter of said internal combustion engine and acting to operate said valve actuating means only once each time said starter is energized.

8. Starting means for an internal combustion engine having a starter, which includes:
    a container holding starting fluid under pressure;
    fluid discharge means connected to the intake of said engine;
    a valve housing having a passageway therethrough, the first end of said passageway being connected to said container and the second end of said passageway being connected to said fluid discharge means;
    a first valve selectively operable to open or close said first end of said passageway to the interior of said container;

a second valve selectively operable to open or close said second end of said passageway to said fluid discharge means;

a resiliently expandable chamber connected to said passageway intermediate said first and second valves and operable to receive a predetermined amount of said starting fluid when said first valve is opened and to discharge said predetermined amount of fluid when said second valve is opened;

a valve-actuating means selectively operable to close said first valve and thereafter open said second valve, or to close said second valve and thereafter open said first valve, whereby said valves are opened in sequence and both valves are never open simultaneously; and operating means connected to said starter of said internal combustion engine and acting to operate said valve actuating means only once each time said starter is energized.

* * * * *